No. 648,491. Patented May 1, 1900.
C. F. HARLOW.
RESILIENT WHEEL.
(Application filed Feb. 19, 1900.)
(No Model.)

WITNESSES.
C. H. Gannett
J. Murphy

INVENTOR.
Charles F. Harlow
by Jas. H. Churchill
atty.

UNITED STATES PATENT OFFICE.

CHARLES F. HARLOW, OF BOSTON, MASSACHUSETTS, ASSIGNOR OF TWO-THIRDS TO WILLIAM P. STRATTON AND CHARLES J. GROVES, OF SAME PLACE.

RESILIENT WHEEL.

SPECIFICATION forming part of Letters Patent No. 648,491, dated May 1, 1900.

Application filed February 19, 1900. Serial No. 5,817. (No model.)

*To all whom it may concern:*

Be it known that I, CHARLES F. HARLOW, a citizen of the United States, residing in Boston, county of Suffolk, and State of Massachusetts, have invented an Improvement in Resilient Wheels, of which the following description, in connection with the accompanying drawings, is a specification, like letters and figures on the drawings representing like parts.

This invention relates to a resilient wheel which is particularly well adapted for use on bicycles, automobiles, and other vehicles. For this purpose the wheel is resiliently supported on its shaft in a manner as will be hereinafter described, and pointed out in the claims at the end of this specification.

Figure 2:
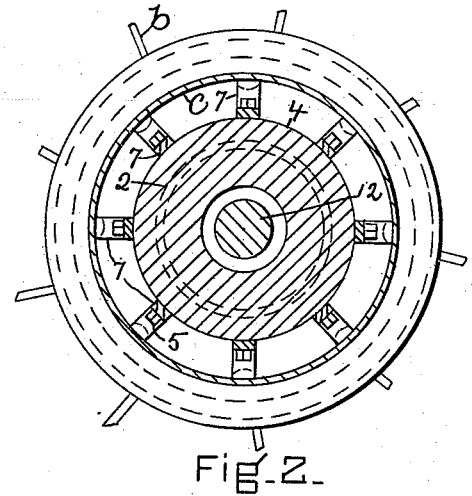
Figure 1:
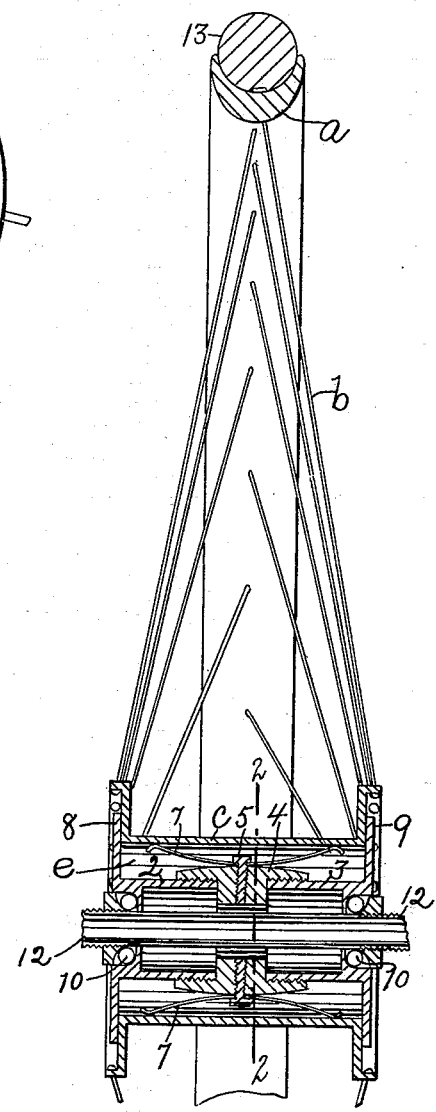

Figure 1 is a section of a sufficient portion of a wheel embodying this invention to enable it to be understood; and Fig. 2 an enlarged section on the line 2 2, Fig. 1.

The main portion of the wheel, comprising the felly or rim $a$, the spokes $b$, and hub $c$, may be of any suitable or usual construction, except that the hub $c$ may be of larger diameter than usual, in order to receive within it a secondary hub or sleeve and leave a space $e$ between said hubs, in which is interposed a yielding medium. In the present instance the secondary hub or sleeve is shown as composed of two sections or parts 2 3, united by a threaded center piece or coupling 4, to which are secured, as by screws or bolts 5, a plurality of springs 7, constituting one form of yielding medium interposed between said hubs and supporting the primary hub $a$ and its attached parts. The springs 7 may be disposed about the secondary sleeve, as shown in Fig. 2. The space $e$ may and preferably will be closed at its ends by annular flanges 8 9 on the parts 2 3 of the secondary sleeve, and the latter may and preferably will be supported on usual ball-bearings 10 on the shaft 12. The felly $a$ may be provided with a solid rubber tire 13, as herein represented, or it may be provided with any other desired tire and by means of the yielding medium supporting the hub $a$ a resilient and easy-riding wheel is obtained, which is simple, durable, comparatively inexpensive, and one into which wheels of ordinary construction may be readily converted. I have shown one form of yielding medium; but I do not desire to limit my invention in this respect, as other forms of yielding medium may be employed.

A wheel embodying this invention is especially advantageous for use on automobiles and road-wagons or carriages, as it enables the large and unsightly pneumatic tires to be dispensed with and yet obtain an easy-riding and neat-appearing wheel.

I claim—

1. The combination with a wheel provided with a primary hub, of a secondary hub or sleeve within said primary hub and composed of sections and a coupling-piece uniting said sections, annular flanges on said sections to close the space between said hubs, and a yielding medium interposed between said hubs and secured to said coupling-piece, substantially as described.

2. The combination with a wheel provided with a primary hub, of a secondary hub or sleeve within said primary hub and composed of sections screw-threaded at their inner ends, and a coupling-piece provided with screw-threaded flanges to engage said screw-threaded sections, and springs secured to said coupling-piece and bearing against the primary hub, substantially as described.

In testimony whereof I have signed my name to this specification in the presence of two subscribing witnesses.

CHARLES F. HARLOW.

Witnesses:
JAS. H. CHURCHILL,
J. MURPHY.